3,082,230
PROCESS FOR THE PREPARATION OF HEXA-ORGANO-DISTANNOXANES

Christoph Dorfelt, Burghausen, Upper Bavaria, and Heinz Gelbert, Margarethenberg, Upper Bavaria, Germany, assignors to Farbwerke Hoechst Aktiengesellschaft vormals Meister Lucius & Brüning, Frankfurt am Main, Germany, a corporation of Germany
No Drawing. Filed June 20, 1960, Ser. No. 37,038
Claims priority, application Germany June 23, 1959
5 Claims. (Cl. 260—429.7)

The present invention provides a simple one-stage process for the preparation of hexa-organo-distannoxanes.

In the art, these compounds are known under the designation hexa-organo-distannoxanes or bis-tri-organo-tin-oxides; it is also known to prepare them by reacting tri-organo-tin-chlorides with an alkali metal hydroxide solution, for example, sodium hydroxide solution, and subsequently splitting off water.

The process of that reaction proceeds in two stages; in the first one, the tri-organo-tinhydroxide is formed by the hydrolysis of the tri-organo-tinchloride according to the equation:

$$R_3SnCl + NaOH \rightarrow R_3SnOH + NaCl$$

which is subsequently converted by dehydration into the hexa-organo-distannoxane:

$$2R_3SnOH \rightarrow R_3Sn\text{—}O\text{—}SnR_3 + H_2O$$

In order to completely convert the tri-organo-tinhydroxide into the distannoxane, it is necessary to remove in the second stage of the process the total quantity of water from the reaction mixture.

According to the literature, the distannoxane is prepared by dissolving the corresponding tri-organo-tinchloride in ether and then mixing the whole by stirring or shaking, if required while heating, with an aqueous alkali hydroxide solution, for example, a sodium or potassium hydroxide solution. After the reaction is complete, the aqueous, salt-containing layer is separated, the ethereal layer is washed and dried, and the ether is evaporated. The crude product remaining behind as residue is then heated for a short period under reduced pressure in order to remove any solvent possibly adhering and in order to convert by splitting off water all the tri-organo-tin-hydroxide into the desired distannoxane. However, the described procedure has the disadvantage that persistent emulsions form in the course of the separation of the ethereal solution from the aqueous layer which make the working up difficult and cumbersome. According to experience, these emulsions even form when the ether, which already by reason of its explodability is less suitable for the fabrication on a technical scale, is replaced by another solvent or even when working completely without solvent. Although it is possible to prevent to a certain degree the formation of an emulsion or destroy an emulsion formed, by the application of known measures, for example, the addition of sodium chloride, heating or centrifugation, these auxiliary measures make necessary an additional expenditure of chemical agents, energy or apparatuses which increase the cost of the process. In addition thereto, there occur substance losses in many cases during the working up which also result in a reduction of the yields.

It has also been proposed to perform the reaction of the tri-organo-tinchloride to the hexa-organo-distannoxane by boiling the first with an alcoholic sodium or potassium hydroxide solution. Although in this process the operation is effected in homogenous phase, good yields are not obtained because, in particular at higher temperatures and prolonged reaction periods, the hexa-organo-distannoxane decomposes according to the equation:

$$R_3Sn\text{—}O\text{—}SnR_3 \rightarrow R_4Sn + R_2SnO$$

into tetra-organotin and di-organotin oxide. In German Patent 957,483 it has been proposed to reconvert these two decomposition products $R_4Sn$ and $R_2SnO$ into the tri-organo-tinchloride and to treat the latter again with an alkali hydroxide solution. The yield can be increased in this manner but the working up of the by-product requires a considerable expenditure of work, as the di-organo-tinoxide must first be converted into the corresponding di-organo-tindichloride by reacting it with hydrochloric acid.

$$R_2SnO + 2HCl \rightarrow R_2SnCl_2 + H_2O$$

the dichloride must then be converted into the tri-organo-tinchloride by heating it to 200–220° C. with the equivalent quantity of tetra-organo-tin according to the equation:

$$R_2SnCl_2 + R_4Sn \rightarrow 2R_3SnCl$$

It is clear that the performance of these two side processes entails a considerable increase in cost.

The present invention provides a process by which the hexa-organo-distannoxanes are obtained in simple manner and in very good yields, in one operational step, without the above-mentioned drawbacks occurring.

Now, we have found that organo-tin compounds of the general formula $$R_3Sn\text{—}O\text{—}SnR_3$$

wherein R represents a radical selected from the group consisting of aliphatic radicals containing 1 to 8 carbon atoms, the phenyl, tolyl, cyclohexyl and benzyl radical, can be prepared by refluxing a mixture of a tri-organo-tinchloride of the general formula $$R_3SnCl$$

wherein R has the meaning given above, and an aqueous dispersion of a compound selected from the group consisting of potassium-, sodium- and calcium-hydroxide, magnesiumoxide, sodium-carbonate and sodium-bi-carbonate, and a solvent selected from the group consisting of petroleum ether, benzene, dipropyl ether, diisopropyl ether and methylethyl ketone, and removing by azeotropic distillation the water added as well as the water formed in the course of the reaction.

It is suitable to pass the distillate, after it has left the cooler, through a separator in which the water is separated, while the solvent flows back into the reaction vessel. As soon as no more water passes over, the reaction product is separated from the salt formed during the hydrolysis by filtration and then the solvent is removed from the filtrate by evaporation. The desired hexa-organo-distannoxane remains behind as residue in pure form and in a very good yield. This mode of operation excludes the formation of emulsions during the working up, since all the water is already removed from the reaction mixture. Also, the by-products mentioned are practically not formed, when providing for, by the use of low-boiling solvents, that the temperature in the reaction zone does not rise too much. It has been found that the formation of the mentioned decomposition products is avoided when operating suitably at temperatures below 100° C. The maintenance of this temperature limit is of great importance for the yield to achieve and, therefore, an important criterion of the present invention.

The solvent used as dragging agent for the elimination of the water must not react with the reactants and shall be soluble in water in a low degree only or not at all. Low-boiling hydrocarbons, such as petroleum ether or benzene, are best suitable but low-boiling ethers, such as dipropyl ether or diisopropyl ether, or ketones, such as the methylethyl ketone, may also be used. As hydrolysing alkali, there may be used organic as well as inorganic bases. Most suitable are inorganic bases, such as solutions of sodium-, potassium- and ammonium hydroxide, sodium carbonate, sodium bicarbonate, calcium hydroxide or magnesium oxide. These alkaline substances may be used in aqueous solution, or if they are difficulty soluble in water as, for example, the calcium hydroxide, they can be applied in aqueous suspension.

As starting substances for the process of the present invention, there may be used tri-organo-tinchlorides that contain aliphatic, aromatic, aliphatic-aromatic or cycloaliphatic hydrocarbon radicals bound to tin, for example: trimethyltinchloride, tributyltinchloride, triisobutyltinchloride, trihexyltinchloride, tri-(2-ethylhexyl)-tinchloride, trioctyltinchloride, triphenyltinchloride, tritolyltinchloride, tribenzyltinchloride, tricyclohexyltinchloride.

The hexa-organo-distannoxanes may be used as pesticidal agents, in particular as fungicides, and as stabilizers in the manufacture of chlorine-containing polymers. Furthermore, they may be used as intermediate products for the preparation of other organo-tin-compounds.

The following examples illustrate the invention:

*Example 1*

162.6 grams of tributyltinchloride are dissolved in 500 cc. of benzene, a solution of 21 grams of caustic soda in 60 cc. of water is added, and the mixture is refluxed for 3 hours with stirring, the internal temperature being 75° C. The benzene-water-mixture is then distilled over a descending cooler and the water dragged along is separated in a following separator, whereas the benzene is reflowed into the flask. After 4 hours, no more water passes over, and the internal temperature has risen from 75° C. to 80° C. The content of the flask is separated from the common salt formed during the reaction by filtration with suction, and the benzene is removed from the filtrate by distillation in the vacuum. As residue, there remain behind 132.1 grams of pure hexabutyldistannoxane in the form of a light, clear oil. Yield: 88.7% of the theory.

*Example 2*

A solution of 162.6 grams of tributyltinchloride in 500 cc. of benzene is heated under reflux for two hours with a potassium hydroxide solution of 20% strength (internal temperature 76° C.), and subsequently, the total quantity of water is removed by azeotropic distillation as described in Example 1. After elimination by filtration of the potassium chloride formed and removal of the benzene from the filtrate by distillation, there remain behind 141 grams of pure hexabutyldistannoxane. Yield: 94.7% of the theory.

*Example 3*

162.6 grams of tributyltinchloride are dissolved in 500 cc. of benzene, the solution is added with 40 grams of sodium hydroxide solution of 50% strength in a stirring flask, and the mixture so obtained is heated to the boil, while stirring, for two hours. The temperature in the flask is then at 75° C. The water is removed by azeotropic distillation, the temperature rising during that time to 80° C. When no more water passes over, the residue in the flask is separated from the common salt by filtration with suction, the benzene is distilled off from the filtrate. The residue consists of pure hexabutyldistannoxane. The yield amounts to 137 grams=92% of the theory.

*Example 4*

96.3 grams of triphenyltinchloride are dissolved in 250 cc. of benzene and the solution so obtained is added, while stirring, with 21 grams of sodium hydroxide solution of 50% strength. The mixture is then heated under reflux to the boil (internal temperature 74° C.), and the water is subsequently removed by joint distillation with the benzene in the manner described in the preceding examples. The temperature rises during that time to 80° C. The contents of the reaction vessel are then separated from the common salt by filtration and the benzene is removed from the filtrate by distillation. As residue, there remain behind 86.2 grams of pure, crystallized hexaphenyldistannoxane. The substance crystallizes in well formed sheets and has a melting point of 120–122° C. Yield: 96.4% of the theory.

If the same experiment is carried out with xylene instead of benzene, the temperature rises to 137° C. during the removing of the water by azeotropic distillation. After working up, there are obtained only 67 grams of hexaphenyldistannoxane, i.e. 74.9% of the theoretical yield. As by-products, there form 4.2 grams of diphenyltinoxide and 6.4 grams of tetraphenyltin.

*Example 5*

48 grams of tribenzyltinchloride are dissolved in 200 cc. of benzene, 9.4 grams of sodium hydroxide solution of 50% strength are added, and the mixture is heated to the boil for one hour. The temperature in the interior of the reaction vessel is 73° C. Thereupon, the water is removed in the manner described in the foregoing examples, the temperature rising during that time to 80° C. When all the water has passed over, the benzolic solution is separated from the common salt by filtration and the benzene is evaporated. There remain behind 43.9 grams of hexabenzyldistannoxane in pure, crystalline form. The substance constitutes angular sheets and melts at 118–120° C. The yield is 43.9 grams=97.8% of the theory.

*Example 6*

48.1 grams of triphenyltinchloride are dissolved in 250 cc. of benzene, 140 grams of milk of lime having a CaO-content of 10% are added, and the mixture is refluxed for two hours, while stirring. Subsequently, the water is removed by azeotropic distillation with benzene in the manner described, the residue that remains behind in the reaction vessel is filtered off, and the benzol separated from the filtrate by distillation. There remain behind 44 grams of pure crystalline hexaphenyldistannoxane. Melting point: 120–122° C. The yield is 98.4% of the theory.

*Example 7*

27.54 kilograms of tributyltinchloride are dissolved in 75 kilograms of benzene, in a vessel made of VA steel (stainless steel) and having a capacity of 100 liters, and the solution is added with 6.78 kilograms of sodium hydroxide solution of 50% strength. The mixture is heated under reflux for 24 hours, while stirring, and the water is simultaneously removed by azeotropic distillation over a separator. Then the benzene is distilled off and the residue is separated from the precipitated common salt by filtration. There are obtained 20.6 kilograms of hexabutyldistannoxane, i.e. 81.7% of the theoretical yield.

*Example 8*

162.6 grams of tributyltinchloride are dissolved in 400 cc. of dipropylether, 40 grams of sodium hydroxide solution of 50% strength are added, and the mixture is refluxed, while stirring for one hour, during which time the temperature in the interior of the reaction vessel rises to 85° C. The water is then removed by azeotropic distillation in the manner described in the foregoing examples, the remaining solution is filtered to remove the common salt formed, and the dipropyl ether evaporated. There remain behind 136 grams of pure hexabutyldistannoxane. The yield is 91.4% of the theory.

*Example 9*

A solution of 162.5 grams of tributyltinchloride in 500 cc. of benzene is added dropwise, while stirring, with a solution of 29 grams of anhydrous soda in 110 cc. of water. The whole is then heated to the boil and all the water is removed by azeotropic distillation with benzene in the manner described heretofore. The benzolic solution is filtered to remove the common salt formed, and the benzene is removed from the filtrate by distillation. As residue there remain behind 134 grams of bis-tributyltinoxide. Yield: 90% of the theory.

*Example 10*

199.2 grams of trimethyltinchloride are dissolved in 300 cc. of di-n-propylether, and the whole is introduced, while stirring, into a solution of 40 grams of caustic soda in 80 cc. of water. The mixture is heated to the boil and all the water is removed by azeotropic distillation with the dipropyl ether. During this time the temperature in the reaction vessel does not exceed 90° C. The common salt formed is filtered off and the filtrate is separated from dipropylether by distillation. There remain behind 158 grams of hexamethyldistannoxane in the form of a white powder. Yield: 92% of the theory.

*Example 11*

123.3 grams of tri-n-octyltinchloride are dissolved in 200 cc. of a petroleum ether boiling at 70–90° C., a solution of 14 grams of caustic potash in 56 grams of water is added, and the whole is heated to the boil, while stirring. The water is removed by azeotropic distillation with the benzine (maximum temperature in the reaction vessel 90° C.), the potassium chloride formed is then removed by filtration, and the benzine is removed from the filtrate by distillation. As residue, there remain behind 112 grams of hexaoctyldistannoxane. The compound constitutes a viscous yellow oil. Yield: 96.2% of the theory.

*Example 12*

A solution of 100.8 grams of tricyclohexyltinchloride in 200 cc. of methylethylketone is mixed, while stirring, with 21 grams of sodium hydroxide solution of 50% strength. The mixture is heated to the boil and the water is removed by azeotropic distillation with the methylethylketone in the manner described in the preceding examples. During this process, the temperature in the reaction vessel remains continuously below 80° C. The common salt is filtered off and the methylethylketone is removed from the filtrate by distillation. There remain behind 90 grams of hexacyclohexyldistannoxane as residue. The compound forms a thick, slowly crystallizing oil. The yield is 95.8% of the theory.

*Example 13*

106.8 grams of tri-p-toluyl-tinchloride are dissolved in 300 cc. of benzene and 40 grams of a 25% sodium hydroxide solution are then added with stirring. The whole is heated to the boil and the water is removed in the manner described by azeotropic distillation with benzene. The benzolic solution is separated from the common salt formed and the benzene is removed from the filtrate by distillation. The residue consists of 94 grams of hexa-(p-toluyl)-distannoxane, a viscous thick oil, which slowly crystallizes. Yield: 93.1% of the theory.

We claim:

1. A process for the manufacture of organo-tin compounds of the general formula $$R_3Sn—O—SnR_3$$

wherein R represents a member selected from the group consisting of alkyl radicals containing 1 to 8 carbon atoms, the phenyl, tolyl, cyclohexyl and benzyl radical, which consists of refluxing at a temperature below 100° C. a mixture of a triorgano-tinchloride of the general formula $$R_3SnCl$$

wherein R has the meaning given above, and an aqueous dispersion of a member selected from the group consisting of sodium, potassium and calcium hydroxide, sodium carbonate and sodium bicarbonate and an inert organic solvent selected from the group consisting of petroleum ether, benzene, di-n-propyl ether, diisopropyl ether and methylethyl ketone and removing all of the water added as well as all of the water formed in the course of the reaction by azeotropic distillation.

2. A process for the manufacture of organo-tin compounds of the general formula $$R_3Sn—O—SnR_3$$

wherein R is a phenyl radical, which consists of refluxing at a temperature below 100° C. a mixture of a triorgano-tinchloride of the general formula $$R_3SnCl$$

wherein R has the meaning given above, and an aqueous dispersion of a member selected from the group consisting of sodium, potassium and calcium hydroxide, sodium carbonate and sodium bicarbonate; and an inert organic solvent selected from the group consisting of petroleum ether, benzene, di-n-propyl ether, diisopropyl ether and methylethyl ketone, and removing all of the water added as well as all of the water formed in the course of the reaction by azeotropic distillation.

3. A process for the manufacture of organo-tin compounds of the general formula $$R_3Sn—O—SnR_3$$

wherein R is a tolyl radical, which consists of refluxing at a temperature below 100° C. a mixture of a triorgano-tinchloride of the general formula $$R_3SnCl$$

wherein R has the meaning given above, and an aqueous dispersion of a member selected from the group consisting of sodium, potassium and calcium hydroxide, sodium carbonate and sodium bicarbonate; and an inert organic solvent selected from the group consisting of petroleum ether, benzene, di-n-propyl ether, diisopropyl ether and methylethyl ketone, and removing all of the water added as well as all of the water formed in the course of the reaction by azeotropic distillation.

4. A process for the manufacture of organo-tin compounds of the general formula $$R_3Sn—O—SnR_3$$

wherein R is a cyclohexyl radical, which consists of refluxing at a temperature below 100° C. a mixture of a triorgano-tinchloride of the general formula $$R_3SnCl$$

wherein R has the meaning given above, and an aqueous dispersion of a member selected from the group consisting of sodium, potassium and calcium hydroxide, sodium carbonate and sodium bicarbonate; and an inert organic solvent selected from the group consisting of petroleum ether, benzene, di-n-propyl ether, diisopropyl ether and methylethyl ketone, and removing all of the water added as well as all of the water formed in the course of the reaction by azeotropic distillation.

5. A process for the manufacture of organo-tin compounds of the general formula $$R_3Sn—O—SnR_3$$

wherein R is a benzyl radical, which consists of refluxing at a temperature below 100° C. a mixture of a triorgano-tinchloride of the general formula $$R_3SnCl$$

wherein R has the meaning given above, and an aqueous dispersion of a member selected from the group consisting of sodium, potassium and calcium hydroxide, sodium carbonate and sodium bicarbonate; and an inert organic solvent selected from the group consisting of petroleum ether, benzene, di-n-propyl ether, diisopropyl ether and methylethyl ketone, and removing all of the water added as well as all of the water formed in the course of the reaction by azeotropic distillation.

References Cited in the file of this patent

UNITED STATES PATENTS

| | | |
|---|---|---|
| 2,770,611 | Nitzsche et al. | Nov. 13, 1956 |
| 2,868,820 | Nitzsche et al. | Jan. 13, 1959 |
| 2,892,856 | Ramsden et al. | June 30, 1959 |

OTHER REFERENCES

Brown et al.: "Unit Operations," John Wiley & Sons, Inc., 1950, pp. 393–394 relied on.

Luijten et al.: "Investigations in the Field of Organotin Chemistry," Tin Research Institute, October 1955, pp. 104, 105, 107, 108, 110, and 111 relied on.